United States Patent
Liao et al.

(10) Patent No.: US 7,542,819 B2
(45) Date of Patent: Jun. 2, 2009

(54) METHOD AND SYSTEM FOR MANAGING PRODUCT OUTPUT

(75) Inventors: Yi-Ming Liao, Taipei (TW); Pei-Huan Chung, Taipei (TW); Cheng-Ju Chen, Taipei (TW); Ching-Ching Chang, Taipei (TW); Wen-Yi Chang, Taipei (TW)

(73) Assignee: Inventec Corporation, Taipei (TW)

( * ) Notice: Subject to any disclaimer, the term of this patent is extended or adjusted under 35 U.S.C. 154(b) by 2015 days.

(21) Appl. No.: 09/990,680

(22) Filed: Nov. 15, 2001

(65) Prior Publication Data

US 2003/0078822 A1 Apr. 24, 2003

(51) Int. Cl.
*G06F 19/00* (2006.01)
(52) U.S. Cl. .......................... 700/99; 700/101; 700/108; 700/111; 705/1; 705/8; 707/10
(58) Field of Classification Search ........... 700/99–101, 700/108, 111, 117; 705/1, 8; 707/102
See application file for complete search history.

(56) References Cited

U.S. PATENT DOCUMENTS

| | | | |
|---|---|---|---|
| 6,954,907 B2* | 10/2005 | Nakano et al. ............... | 716/1 |
| 2001/0044667 A1* | 11/2001 | Nakano et al. ............. | 700/100 |
| 2003/0014270 A1* | 1/2003 | Qureshi et al. .............. | 705/1 |

* cited by examiner

*Primary Examiner*—Albert DeCady
*Assistant Examiner*—Douglas S. Lee

(57) ABSTRACT

A method and a system for managing product output are proposed, for connecting work partners at different locations of an enterprise through a network to the managing system, wherein an enterprise can assign an order from a client to a work partner who needs to increase profits, and allow another work partner to perform product manufacture and output according to the order. Moreover, after loginning the managing system, work partners at different locations of the enterprise can accurately monitor and control operation conditions associated with product manufacture, so that the enterprise can effectively manage distribution and flow of business performances and profits.

11 Claims, 10 Drawing Sheets

FIG. 4(A)

| Date | element data | Rec./reqd quantity |
|---|---|---|
| 04/02/2001 | 0011207680(TP01) | 1.000 - |
| 04/04/2001 | 0002442886/Stock | 219.000 |
| 04/04/2001 | 0002442887/Stock | 2.000 |
| 04/04/2001 | 0002442888/Stock | 1.000 |
| 04/04/2001 | 4500022111(TP01) | 100.000 - |

300 — Product category PC7665HAA001
301 — Manufactory CP01
30
302

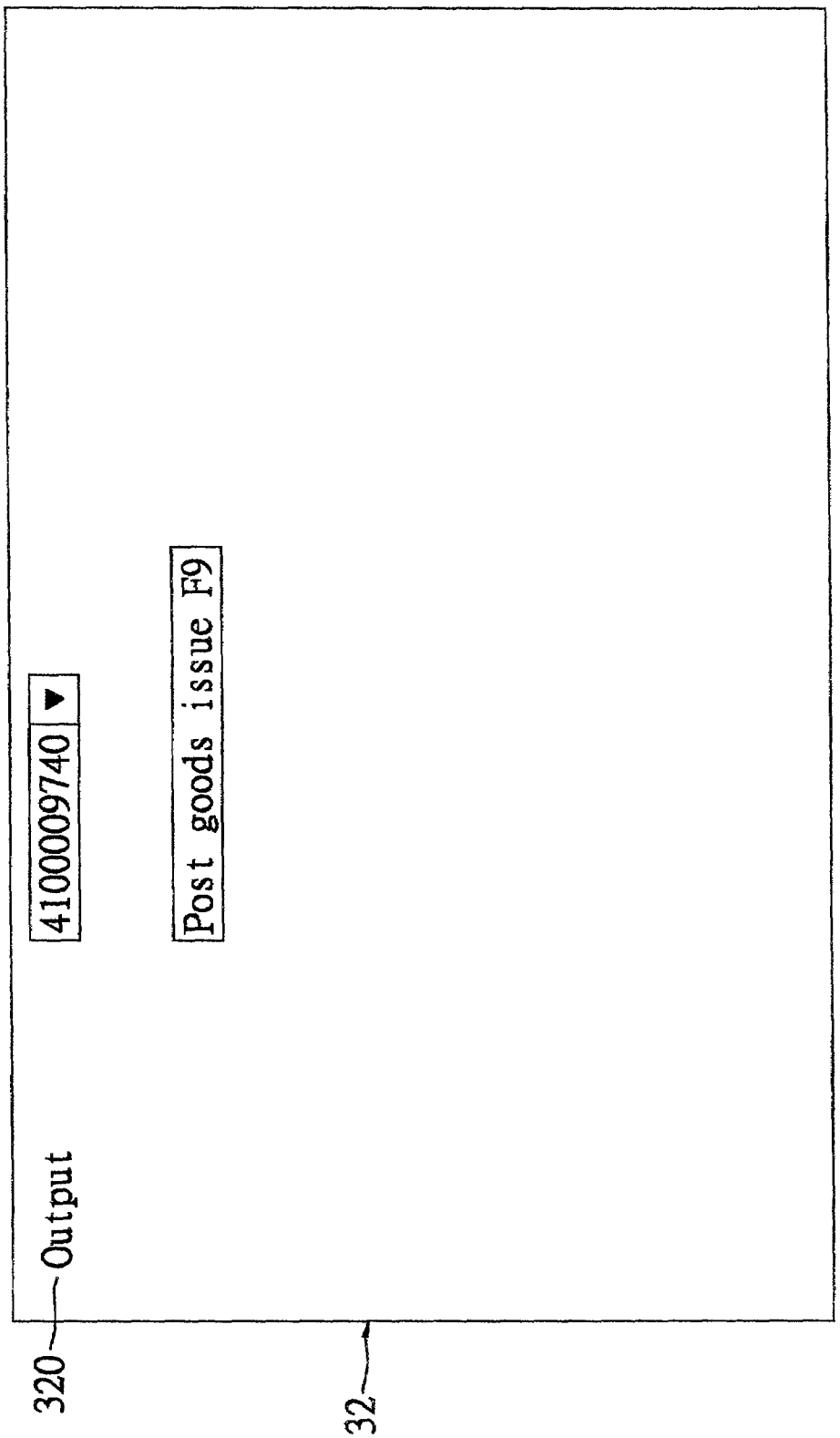

FIG. 4(D)

330 — Product category [PC7665HAA001] ▶

331 — Manufactory [CP01]

| Date | element data | REC./reqd quantity |
|---|---|---|
| 04/02/2001 | 0011207680(TP01) | 1.000 − |
| 04/04/2001 | 0002442886/Stock | 219.000 |
| 04/04/2001 | 0002442887/Stock | 2.000 |
| 04/04/2001 | 0002442000/Stock | 1.000 |

33 —
332 —

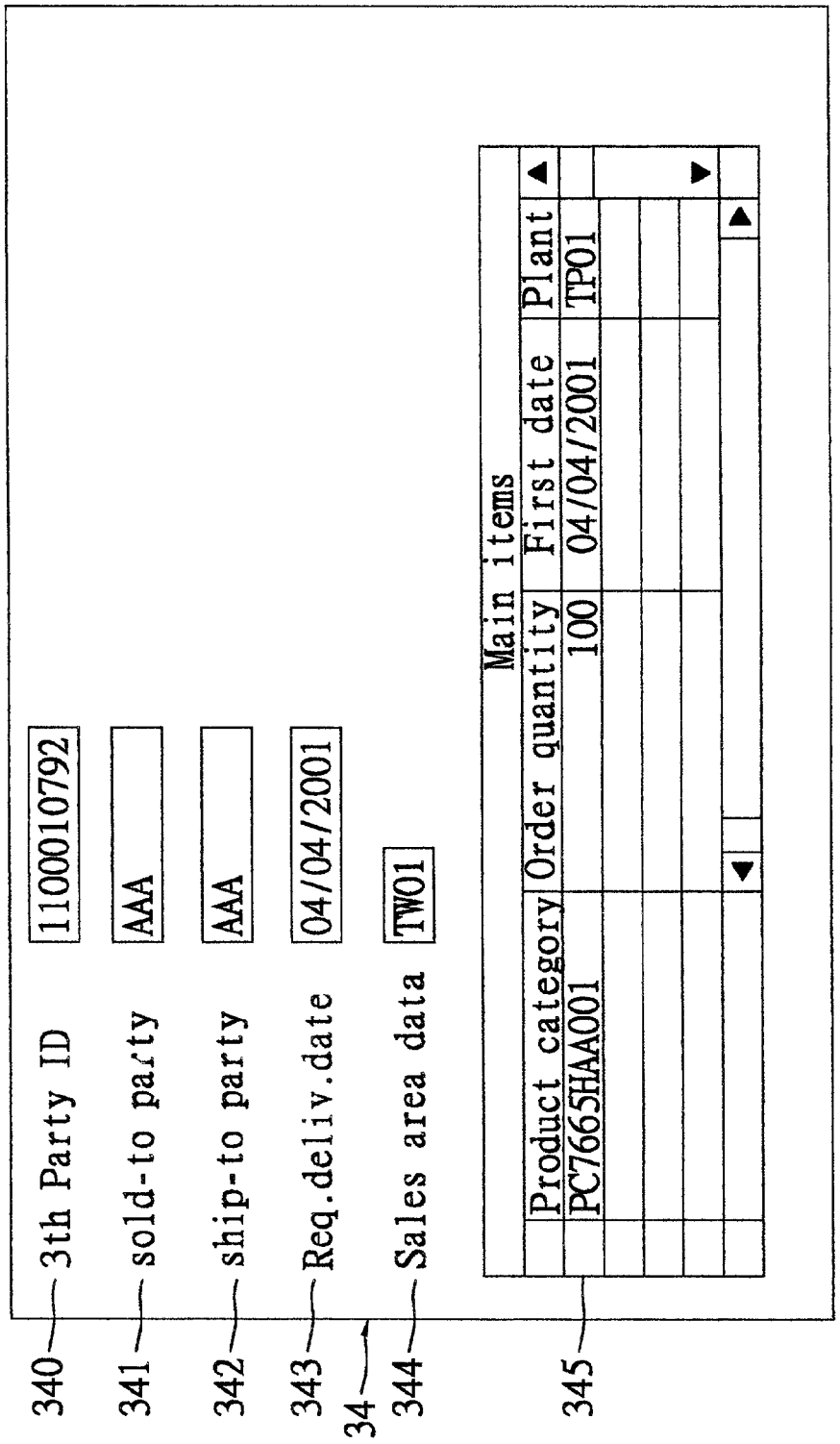

FIG. 4(F)

| Date | element data | Rec./reqd quantity |
|---|---|---|
| 04/01/2001 | 1100010787/Stock | 1.000 |
| 04/01/2001 | 1100010788/Stock | 1.000 |
| 04/02/2001 | 0011207680/Stock | 1.000 |
| 04/04/2001 | 4500022111 | 100.000 |
| 04/04/2001 | 1100010792 | 100.000- |

Product category  PC7665HAA001
Manufactory  TP01

350 — Product category
351 — Manufactory
352 — (table)
35

FIG. 4(G)

| | |
|---|---|
| Product category | PC7665HAA001 ▼ |
| Manufactory | TP01 |

| Date | element data | Rec./reqd quantity |
|---|---|---|
| 04/01/2001 | 1100010787 | 1.000 |
| 04/01/2001 | 1100010788 | 1.000 |
| 04/02/2001 | 0011207680 | 1.000 |
| 04/03/2001 | 1100010792 | 100.000- |

METHOD AND SYSTEM FOR MANAGING PRODUCT OUTPUT

FIELD OF THE INVENTION

The present invention relates to methods and systems for managing product output, and more particularly, to a method and a system for managing output of products, in which cooperative partners at different locations of an enterprise can assign suitable areas for product manufacture and output according to orders from clients, so as to allow the enterprise to control distribution and flow of profits.

BACKGROUND OF INVENTION

Due to rapid development of electronic information and internet systems, conventional commercial activities can be implemented in the application of interaction between computers and communication networks for completing trading behavior. Therefore, an e-business (electronic business) enterprise is introduced with tools of commercial automation developed in response to e-business, such as enterprise resource planning (ERP), supply chain management (SCM) and customer relationship management (CRM). In particular, such commercial automation tools are significantly useful for an international enterprise, so as to integrate internal and external information systems for the enterprise, and to improve accuracy and speed of information exchange between domestic and overseas cooperative partners of the enterprise.

As cooperative partners of an international enterprise are possibly established in different areas and countries, thus software or system providers start to utilize a mode of application service provider (ASP) so as to entirely activate e-business. For a current international enterprise, if an overseas cooperative partner thereof receives orders from clients, it then executes product manufacture and output according to the received orders. However, under such a regional mode of operation, business performances usually cannot be shared with a main company or other cooperative partners in different areas of the enterprise, and the enterprise also cannot control the distribution of profits.

Therefore, during the evolvement progress of e-business, how to make an international enterprise effectively manage and control the flow of business performances and profits, is a critical problem to solve.

SUMMARY OF THE INVENTION

A primary objective of the present invention is to provide a method and a system for managing product output, allowing an enterprise to manage and control the flow of business performances and profits.

In accordance with the foregoing and other objectives, the present invention proposes a method and a system for managing product output.

The method for managing product output of the invention is used to connect work partners at different locations of an enterprise through a network to a system for managing product output, wherein the managing system allows the enterprise to control distribution of performances and profits. The method for managing product output comprises the steps of: (1) receiving a record of order data from a client via the managing system, and assigning a third party identification number and a first work partner to the order data, wherein the first work partner is used to received the order data; and storing the order data in an order database of the managing system; (2) establishing manufacture data used as reference of product manufacture for a second work partner, wherein the manufacture data at least include a unique third party identification number, at least one product category code, a manufactory for receiving an order, and a client who offers the order; and storing the manufacture data in a manufacture database of the managing system; (3) submitting a request for retrieving manufacture data via the second work partner to the managing system, and retrieving manufacture data from the manufacture database via the managing system corresponding in product category code and manufactory to the retrieval request, so as to display the retrieved manufacture data on a browser of a terminal device to be used as reference of product manufacture for the second work partner; (4) completing product manufacture to be ready for product output via the second work partner according to the retrieved manufacture data, and loginning the managing system to input output associated data of a product category code, an output quantity, output time, a client and a manufactory, so as to allow the managing system to search in the manufacture database for manufacture data corresponding to the inputted output data, and delete the searched manufacture data, for being used as reference of product output for the second work partner; and (5) searching via the managing system in the order database for order data corresponding in third party identification number to the deleted manufacture data, and deleting the searched order data, for being used as reference of product output for the first work partner.

The system for managing product output of the invention is connected to work partners at different locations of an enterprise through a network, for allowing the enterprise to control distribution of performances and profits. The system for managing product output comprises: an analysis module for reacting to a request and a record of order data from a client, wherein upon receiving the order data from the client, the analysis module assigns a third party identification number and a first work partner to the order data, wherein the first work partner is used to received the order data; an order database for storing the order data containing the third party identification number and data of the first work partner assigned by the analysis module, wherein upon receiving a request for retrieving order data from the first work partner, the analysis module retrieves corresponding order data from the order database; a manufacture module prompted by the analysis module to establish manufacture data to be used as reference of product manufacture for a second work partner after the analysis module stores the order data in the order database, wherein a record of order data corresponds in third party identification number to a record of manufacture data, and the manufacture data at least include a unique third party identification number, at least one product category code and a manufactory for receiving an order; a manufacture database for storing the manufacture data established by the manufacture module, wherein upon receiving a request for retrieving manufacture data from the second work partner, the analysis module retrieves corresponding manufacture data with required product category code and manufactory from the manufacture database, for being used as reference of product manufacture for the second work partner; and an output module prompted by the analysis module to retrieve manufacture data from the manufacture database corresponding to a request for inputting an output message from the second work partner, wherein the retrieved manufacture data correspond to the output message in product category code, output quantity, output time, client and manufactory; and the output module for deleting the retrieved manufacture data, and retrieving corresponding order data from the order database according to the deleted manufacture data, so as to delete the retrieved order data, for being used as reference of product output for the first work partner.

In the use of method and system for managing product output of the invention, an enterprise can assign an order from a client to a work partner who needs to increase profits, and allow another work partner to perform product manufacture and output according to the order. Moreover, after loginning the managing system of the invention, work partners at different locations of the enterprise can accurately monitor and control operation conditions associated with product manufacture, so that the enterprise can effectively manage distribution and flow of business performances and profits.

BRIEF DESCRIPTION OF THE DRAWINGS

The present invention can be more fully understood by reading the following detailed description of the preferred embodiments, with reference made to the accompanying drawings wherein:

FIGS. 4(A)-4(G) are schematic diagrams showing practical examples in the use of a method and a system for managing product output of the invention.

DETAILED DESCRIPTION OF THE PREFERRED EMBODIMENT

Figure 1:
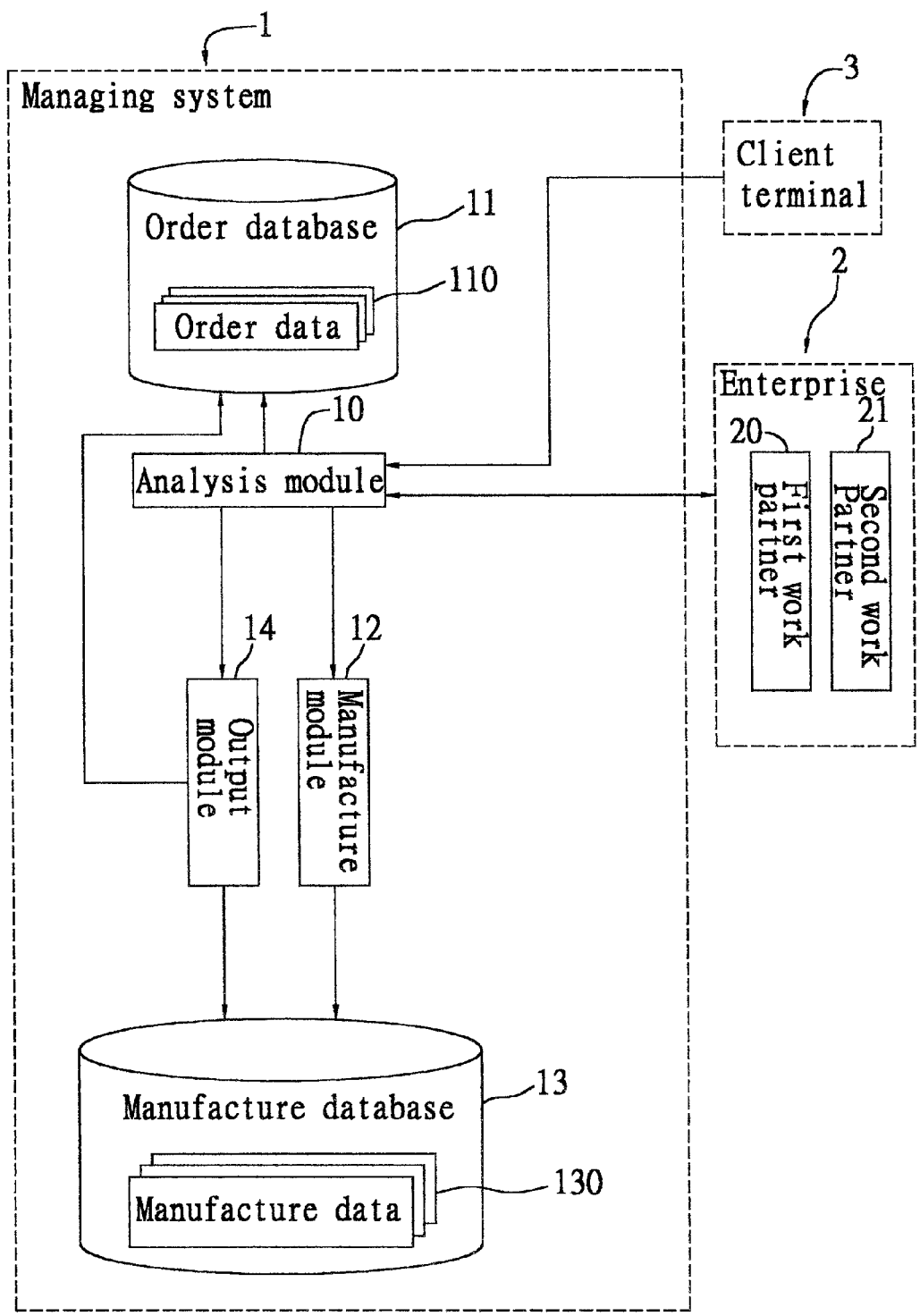
FIG. 1 is a schematic block diagram showing basic architecture of a preferred embodiment of a system for managing product output of the invention.

Referring to FIG. 1, it illustrates basic architecture of a system for managing product output 1 of the invention. As shown in the drawing, the managing system 1 is established in a server (not shown). After work partners at different locations of an enterprise 2 utilize an input/output interface such as a terminal device to be connected to the server through a network communication system (not shown) e.g. internet or intranet, they can interact with the managing system 1 via the server. In order to assure internal security of the enterprise 2, prior to loginning the managing system 1, a user is asked to input a user's name and password, and then, the managing system 1 offers corresponding authorization for data retrieval and system operation to the user according to the inputted user's name and password. Since such an identification process is a necessary step before loginning a system through a network, and is conventional for a person having ordinary skill in network technology, thus it is not farther detailed for its functions and internal architecture, but only associated part thereof relating to the invention is depicted herein.

In this preferred embodiment, the enterprise 2 includes a first work partner 20 and a second work partner 21, wherein the work partners can be respectively established in different areas. The first work partner 20, e.g. a main company, is used to receive and manage orders from clients, and assign profits to itself; whereas the second work partner 21 executes product manufacture according to processed information transmitted from the first work partner 20. This embodiment is exemplified by using the first work partner 20 and the second work partner 21; however, the invention is not limited in number of work partners. The managing system 1 comprises an analysis module 10, an order database 11, a manufacture module 12, a manufacture database 13, and an output module 14.

First, when a client terminal 3 sends a product order in a standard transmission format of electronic data interchange (EDI) to the managing system 1 through the network communication system, the analysis module 10 then generates a record of order data 110 including a third party identification number assigned to the received order, and data of the first work partner 20 inputted thereto, wherein the order is to be received by the first work partner 20. The order data 110 are then stored in the order database 11, and can be used as performance reference for the first work partner 20 of the enterprise 2. Since the EDI process is conventional format standardization protocol for transforming typical business documents to be transmitted between computers and networks, it is not further described herein.

After the analysis module 10 stores the order data 110 with the third party identification number and the data of the first work partner 20 in the order database 11, the manufacture module 12 is prompted to establish a record of manufacture data 130 to be used as operation reference of product manufacture for the second work partner 21, and store the manufacture data 130 in the manufacture database 13. A record of order data 110 corresponds to a record of manufacture data 130 having the same third party identification number. The manufacture data 130 at least include a unique third party identification number, at least one product category code, and a manufactory for receiving the order data 110, so as to allow the second work partner 21 to obtain the manufacture data 130 for product manufacture immediately after loginning the managing system 1.

The analysis module 10 makes reference with manufacture associated information in the order data 110, including a client location, current material stock and manufacture schedule of work partners, for assigning a suitable location for product manufacture and output, where manufacture costs can be desirably reduced due to advantages such as short distance for product output, sufficient material supply, etc. In this embodiment, the second work partner 21 is assigned for product manufacture.

After the second work partner 21 completes product manufacture, it then logins the managing system 1 and submits an output message, wherein the output message includes data of a product category code, an output quantity, output time, a client who offers a product order, and a manufactory who receives the order. After the analysis module 10 receives the output message, the output module 14 is prompted to search in the manufacture database 13 for a record of manufacture data 130 corresponding to the received output message, and then delete the searched manufacture data 130 for outputting the manufactured products to the client. On the other hand, the managing system 1 searches in the order database 11 for a record of order data 110 corresponding in third party identification number to the deleted manufacture data 130, and then deletes the searched order data 110. This is to allow the first work partner 20, after loginning the managing system 1, to realize the completion of product manufacture and output for the order by the second work partner 21

As mentioned above, the foregoing embodiment establishes the system for managing product output 1 of the invention in the server (not shown); however, the order database 11 of the managing system 1 can also be independently constructed in another server, or the manufacture database 13 can be individually constructed in another server, according to practical usage and application if necessary.

In the use of the system for managing product output of the invention, profits can be assigned to predetermined work partners, and after loginning the managing system 1, work partners at different locations of an enterprise can realize operation conditions for product categories in manufacture, so as to accurately monitor current situations of product manufacture and output.

It should be noted that, prior to the managing system 1 of the invention generating the order data 110 to be performance reference for the first work partner 20, and the manufacture data 130 to be manufacture and output reference for the second work partner 21, the work partners need to execute a MRP (material resource preparation) process, so as to in advance perform procedures of material purchase, collection and examination, and to make an optimal manufacture schedule. Since the MRP process is conventional in product manufacture, it is not further detailed, but only associated part thereof relating to the invention is depicted herein.

Figure 2:
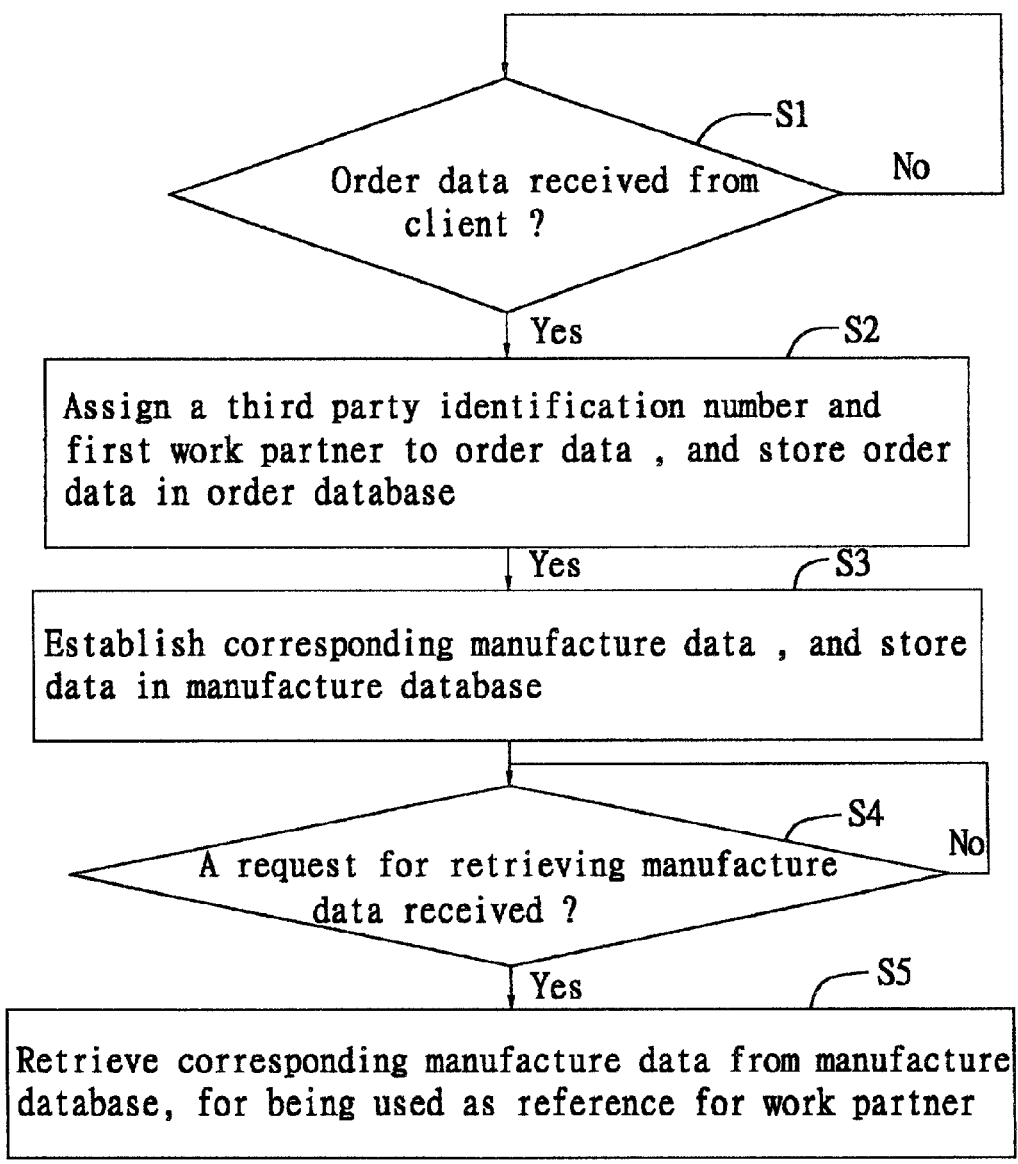
FIG. 2 is a schematic diagram depicting a preferred embodiment of a method for managing product output of the invention.

Referring to FIG. 2, it illustrates a preferred embodiment of a method for managing product output of the invention. The following description is made with reference to FIGS. 1 and 2 for depicting the method for managing product output of the invention.

Since a process for a client terminal 3 to send a product order in an EDI standard transmission format to a managing system 1 through a network communication system, and an identification process for a user to login the managing system 1, are conventional for a person having ordinary skill in network technology, thus they are not further described herein.

First, in step S1, an analysis module 10 of the managing system 1 determines if the client terminal 3 submits a product order. If the order is submitted, then step S2 is implemented; or else, the step S1 is returned.

In step S2, the analysis module 10 establishes a record of order data 110 including a third party identification number assigned to the order, and data of a first work partner 20 of an enterprise 2 inputted thereto, and stores the order data 110 in an order database 11 of the managing system 1. Thereafter, step S3 is implemented.

In step S3, a manufacture module 12 is prompted to establish a record of manufacture data 130 to be operation reference of product manufacture for a second work partner 21 of the enterprise 2 corresponding to the order data 110, wherein the manufacture data 130 are stored in a manufacture database 13 of the managing system 1. A record of order data 110 corresponds in third party identification number to a record of manufacture data 130, and the manufacture data 130 at least include a unique third party identification number, at least one product category code, and a manufactory for receiving an order from a client. Thereafter, step S4 is implemented.

In step S4, the analysis module 10 determines if the second work partner 21 submits a request for retrieving manufacture data 130. If the retrieval request is submitted, then step S5 is implemented; or else, the step S4 is returned.

In step S5, the analysis module 10 retrieves a record of manufacture data 130 from the manufacture database 13 corresponding in product category code and manufactory to the retrieval request, so as to allow the second work partner 21 who submits the retrieval request to perform product manufacture according to the retrieved manufacture data 130.

Therefore, in the use of the foregoing steps, after loginning the managing system 1, the first work partner 20 and the second work partner 21 of the enterprise 2 can obtain required order data and manufacture data, so as to accurately monitor conditions of product manufacture.

Figure 3:
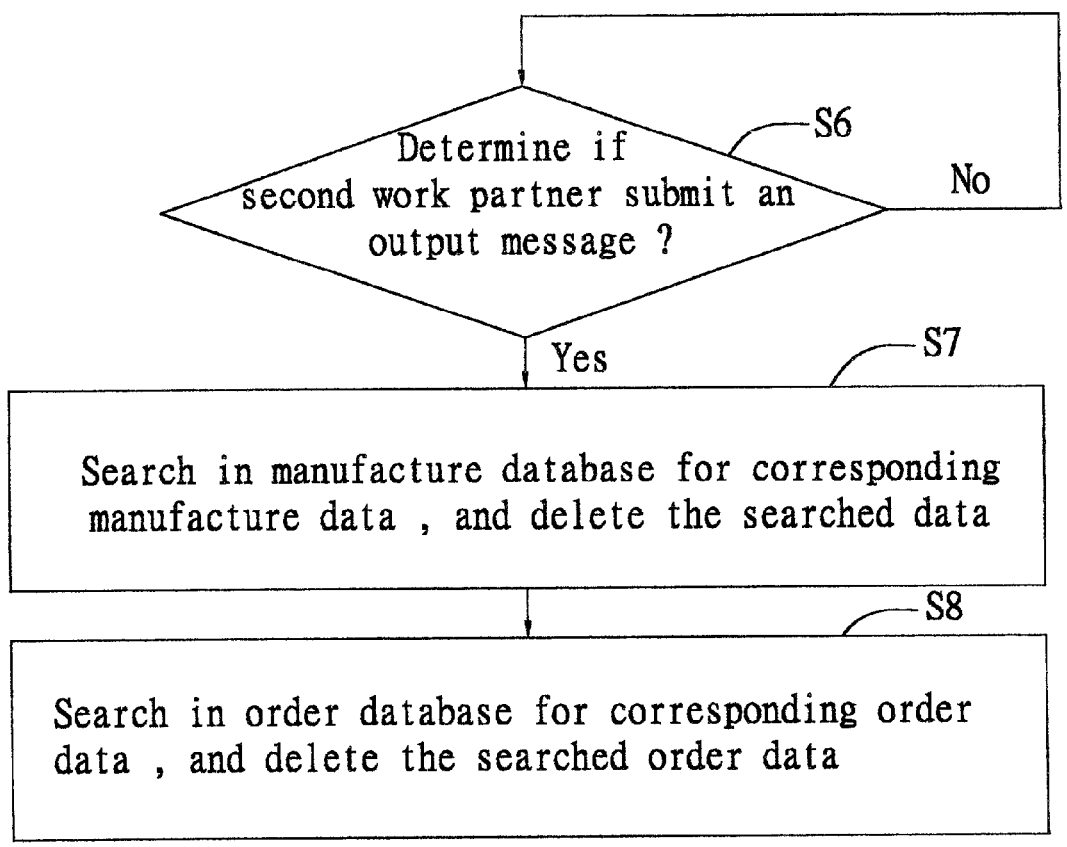
FIG. 3 is a schematic diagram depicting another preferred embodiment of a method for managing product output of the invention.

Illustrated in FIG. 3 is another preferred embodiment of a method for managing product output of the invention. The following description is made with reference to FIGS. 1 and 3 for depicting the method for managing product output of the invention.

First, in step S6, an analysis module 10 determines if a second work partner 21 of an enterprise 2 generates an output message. If the output message is generated, then step S7 is implemented; or else, the step S6 is returned.

In step S7, an output module 14 searches in a manufacture database 13 for a record of manufacture data 130 corresponding to the output message from the second work partner 21 including data of a product category code, an output quantity, output time, a client who offers an order and a manufactory for receiving the order, so as to delete the searched manufacture data 130. Thereafter, step S8 is implemented.

In step S8, the output module 14 is prompted to search in an order database 11 for a record of order data 110 corresponding in third party identification number to the deleted manufacture data 130, and delete the searched order data 110.

Figure 4B:
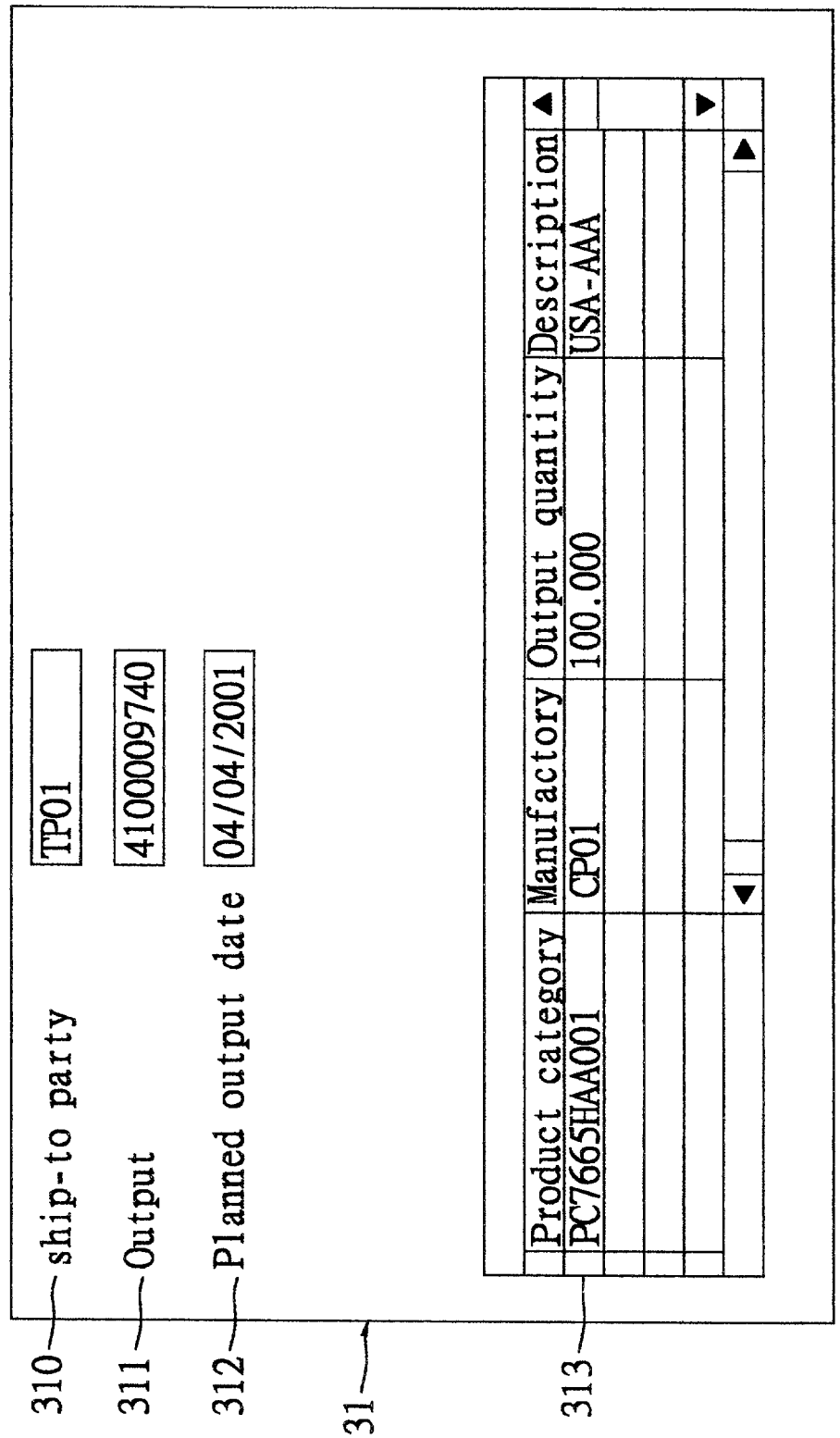

Referring to FIGS. 4(A)-4(G), they illustrate practical examples in the use of a method and a system for managing product output of the invention. As mentioned above, an identification process for a work partner to login the managing system 1 is not further described herein. When a work partner of an enterprise 2 logins the managing system 1 and submits a request, the managing system 1 transmits a picture (30-36) through a network communication system (not shown) to the work partner corresponding to the request. Then, the work partner uses a browser of a terminal device (not shown) for displaying the picture (30-36). The following description is made with reference to FIGS. 1 and 4(A)-4(G) for depicting the method and system for managing product output of the invention. FIGS. 4(A)-4(D) illustrate operation pictures displayed after a second work partner 21 logins the managing system 1; FIGS. 4(E)-4(G) illustrate operation pictures displayed after a first work partner 20 logins the managing system 1.

If the second work partner 21 submits a request for retrieving manufacture data, the picture 30 is displayed on a browser of a terminal device, as shown in FIG. 4(A). The picture 30 at least includes associated data of a product category field 300, a manufactory field 301 belonging to the second work partner 21, a manufacture table 302, etc. The manufacture table 302 includes a plurality of records of manufacture data 130, wherein product category codes and manufactories of the manufacture data 130 act as identification numbers for the manufacture table 302. Therefore, after the second work partner 21 inputs "PC7665HAA001" to the product category field 300 and "CP01" to the manufactory field 301, a manufacture module 12 is prompted to retrieve a record of manufacture data 130 from a manufacture database 13 corresponding to the inputted data, and the retrieved manufacture data 130 are used as manufacture reference for the second work partner 21. As shown in the drawing, the manufacture table 302 illustrates two records of manufacture data 130, including the records of "0011207680(TP1)" and "4500022111(TP01)" shown in a field of "element data". For the "4500022111 (TP01)" record as circled, the label "4500022111" represents a third party identification number of the record of the manufacture data 130, and the label "TP01" represents a manufactory code of the first work partner 20. Moreover, for a number "100.000-" shown in a field of "Rec./reqd quantity", it indicates that still 100 more products need to be manufactured. Therefore, the picture 30 allows the second work partner 21 to realize that there are 100 more products of the "4500022111" category to be manufactured for the manufactory "TP01" of the first work partner 20; that is, the picture 30 is used as reference of product manufacture and output for the second work partner 21.

If a manufactory CP01 of the second work partner 21 completes product manufacture according to the circled manufacture data 130 shown in FIG. 4(A), and desires to output the manufactured products, it then logins the managing system 1 and submits an output message. As shown in FIG. 4(B), the picture 31 includes a manufactory field 310 for receiving order data, a field of output identification number 311, a field of planned output date 312, an output content table 313, for allowing output associated data to be inputted thereto. Next, in the picture 32 shown in FIG. 4(C), an output identification number "4100009740" for product output is inputted to a delivery field 320, and then a button "F9" pressed. This allows the managing system 1 to prompt an output module 14 to retrieve a record of manufacture data 130 from the manufacture database 13 corresponding to associated data relating to the output identification number "4100009740", including an output quantity, output time, a client who offers an order and a manufactory for receiving the order, so as to delete the retrieved manufacture data 130. Then, as shown in the picture 33 of FIG. 4(D) with a circled area as originally circled in FIG. 4(A), since the output identification number "4100009740" used for product output corresponds to the manufacture data 130 with the third party identification number "4500022111", thus the manufacture data 130 with the third party identification number "4500022111" are deleted.

After the managing system 1 receives an order from a client and assigns the first work partner 20 for receiving the order, the first work partner 20 logins the managing system 1 and obtains a record of order data 110 associated with the order. As shown in FIG. 4(E), the picture 34 illustrates associated data of the order data 110 obtained by the first work partner 20 after loginning the managing system 1. The picture 34 at least includes associated data of a field of third party identification number 340, a field of sold-to party 341, a field of ship-to party 342, a field of required delivery data 343, a field of sales area data 344, a product content table 345, etc. The product content table 345 lists the order data 110, and the field of third party identification number 340 indicates that the order data 110 is subjected to a third party for product manufacture and output, wherein the third party of this embodiment is referred to the manufactory CP01 of the second work partner 21. A label "TW01" shown in the field of sales area data 344 represents the order data 110 to be the first work partner 20, and the second work partner 21 executes product manufacture for the order data 110, so as to enhance local performances and profits for the first work partner 20. Next, if the first work partner 20 submits a request for retrieving order data, the picture 35 is displayed on the browser of the terminal device as shown in FIG. 4(F), wherein a circled area "1100010792" illustrated in a product detail table 352 represents a newly added record of order data 110 after processing the foregoing description of FIG. 4(E), and a circled area "4500022111 . . . 100.000" represents that a record of order data 110 is assigned to the manufactory CP01 of the second work partner 21 for product manufacture. Then, if the manufactory CP01 of the second work partner 21 desires to perform product output for corresponding manufacture data 130 with a third party identification number "4500022111" by processing the foregoing description of FIGS. 4(A)-4(D), the output module 14 is prompted to retrieve a record of order data 110 from the order database 11 corresponding in third party identification number "4500022111" to the manufacture data 130, and delete the retrieved order data 110. Therefore, as shown in FIG. 4(G), an order detail table 362 in the picture 36 does not illustrate the deleted order data 110 with the third party identification number "4500022111", allowing the manufactory "TP01" of the first work partner 20 to realize that products of "PC7665HAA001" category for the third party identification number "4500022111" are outputted by the second work partner 21 to the client.

In conclusion, in the use of method and system for managing product output of the invention, an enterprise can assign an order from a client to a work partner who needs to increase profits, and allow another work partner to perform product manufacture and output according to the order. Moreover, after loginning the managing system of the invention, work partners at different locations of the enterprise can accurately monitor and control operation conditions associated with product manufacture.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for managing product output, used to connect work partners at different locations of an enterprise through a network to a system for managing product output, wherein the managing system allows the enterprise to control distribution of performances and profits; the method comprising the steps of:

(1) receiving a record of order data from a client via the managing system, and assigning a third party identification number and a first work partner to the order data, wherein the first work partner is used to receive the order data; and storing the order data in an order database of the managing system; and (2) establishing manufacture data used as reference of product manufacture for a second work partner, wherein the manufacture data at least include a unique third party identification number, at least one product category code, a manufactory for receiving an order, and a client who offers the order; and storing the manufacture data in a manufacture database of the managing system; submitting a request for retrieving manufacture data via the second work partner to the managing system, and retrieving manufacture data from the manufacture database via the managing system corresponding in product category code and manufactory to the retrieval request, so as to display the retrieved manufacture data on a browser of a terminal device to be used as reference of product manufacture for the second work partner: completing product manufacture to be ready for product output via the second work partner according to the retrieved manufacture data, and logging in the managing system to input output associated data of a product category code, an output quantity, output time, a cliend and a manufactory so as to allow the managing system to search in the manufacture database for manufacture data corresponding to the inputted data, and delete the searched manufacture data, for being used as reference of product output for the second work partner; and searching via the managing system in the order database for order data corresponding in third party identification umber to the deleted manufacture data, and deleting the searched order data, for being used as reference of product output the first work partner.

2. A method for managing product output, used to connect work partners at different locations of an enterprise through a network to a system for managing product output, wherein the managing system allows the enterprise to control distribution of performances and profits; the method comprising the steps of:

(1) receiving a record of order data from a client via the managing system, and assigning a third party identification number and a first work partner to the order data, wherein the first work partner is used to received the order data; and storing the order data in an order database of the managing system;

(2) establishing manufacture data used as reference of product manufacture for a second work partner, wherein the manufacture data at least include a unique third party identification number, at least one product category code, a manufactory for receiving an order, and a client who offers the order; and storing the manufacture data in a manufacture database of the managing system;

(3) submitting a request for retrieving manufacture data via the second work partner to the managing system, and retrieving manufacture data from the manufacture database via the managing system corresponding in product category code and manufactory to the retrieval request, so as to display the retrieved manufacture data on a browser of a terminal device to be used as reference of product manufacture for the second work partner;

(4) completing product manufacture to be ready for product output via the second work partner according to the retrieved manufacture data, and loginning the managing system to input output associated data of a product category code, an output quantity, output time, a client and a manufactory, so as to allow the managing system to search in the manufacture database for manufacture data corresponding to the inputted output data, and delete the searched manufacture data, for being used as reference of product output for the second work partner; and (5) searching via the managing system in the order database for order data corresponding in third party identification number to the deleted manufacture data, and deleting the searched order data, for being used as reference of product output for the first work partner.

3. The method of claim 1, wherein the order data from the client is transmitted in a transmission format of electronic data interchange (EDI).

4. The method of claim 2, wherein the order data from the client is transmitted in an EDI transmission format.

5. The method of claim 1, wherein the network is internet or intranet.

6. The method of claim 2, wherein the network is internet or intranet.

7. The method of claim 1, wherein the managing system is established in a website server.

8. A system for managing product output, connected to work partners at different locations of an enterprise through a network, for allowing the enterprise to control distribution of performances and profits; the system comprising:

an analysis module for reacting to a request and a record of order data from a client, wherein upon receiving the order data from the client, the analysis module assigns a third party identification number and a first work partner to the order data, wherein the first work partner is used to received the order data;

an order database for storing the order data containing the third party identification number and data of the first work partner assigned by the analysis module, wherein upon receiving a request for retrieving order data from the first work partner, the analysis module retrieves corresponding order data from the order database;

a manufacture module prompted by the analysis module to establish manufacture data to be used as reference of product manufacture for a second work partner after the analysis module stores the order data in the order database, wherein a record of order data corresponds in third party identification number to a record of manufacture data, and the manufacture data at least include a unique third party identification number, at least one product category code and a manufactory for receiving an order;

a manufacture database for storing the manufacture data established by the manufacture module, wherein upon receiving a request for retrieving manufacture data from the second work partner, the analysis module retrieves corresponding manufacture data with required product category code and manufactory from the manufacture database, for being used as reference of product manufacture for the second work partner; and an output module prompted by the analysis module to retrieve manufacture data from the manufacture database corresponding to a request for inputting an output message from the second work partner, wherein the retrieved manufacture data correspond to the output message in product category code, output quantity, output time, client and manufactory; and the output module for deleting the retrieved manufacture data, and retrieving corresponding order data from the order database according to the deleted manufacture data, so as to delete the retrieved order data, for being used as reference of product output for the first work partner.

9. The system of claim 8, wherein the order data from the client is transmitted in a transmission format of electronic data interchange (EDI).

10. The system of claim 8, wherein the network is internet or intranet.

11. The system of claim 8, wherein the managing system is established in a website server.

* * * * *